United States Patent
Alaqeel et al.

(10) Patent No.: US 10,649,515 B2
(45) Date of Patent: May 12, 2020

(54) POWER MANAGEMENT OF COMPUTING AND COMMUNICATIONS SYSTEMS DURING POWER FLUCTUATION AND SUDDEN POWER FAILURE EVENTS

(71) Applicant: Saudi Arabian Oil Company, Dhahran (SA)

(72) Inventors: Khalid Khalifa Alaqeel, Dhahran (SA); Syed Kamran Javaid, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 196 days.

(21) Appl. No.: 15/894,439

(22) Filed: Feb. 12, 2018

(65) Prior Publication Data
US 2019/0250688 A1    Aug. 15, 2019

(51) Int. Cl.
*G06F 1/30* (2006.01)
*G06F 9/4401* (2018.01)
*G06F 1/26* (2006.01)

(52) U.S. Cl.
CPC .............. *G06F 1/305* (2013.01); *G06F 1/263* (2013.01); *G06F 1/30* (2013.01); *G06F 9/442* (2013.01); *G06F 9/4418* (2013.01)

(58) Field of Classification Search
CPC . G06F 1/263; G06F 1/30; G06F 1/305; G06F 9/4418; G06F 9/442
See application file for complete search history.

(56) References Cited

U.S. PATENT DOCUMENTS

| | | | |
|---|---|---|---|
| 4,234,920 A | 11/1980 | Van Ness et al. | |
| 5,315,161 A | 5/1994 | Robinson et al. | |
| 5,317,752 A | 5/1994 | Jewett et al. | |
| 5,978,236 A | 11/1999 | Faberman et al. | |
| 6,274,949 B1 * | 8/2001 | Lioux | G06F 1/30 307/64 |
| 7,131,011 B2 | 10/2006 | Westerinen et al. | |
| 8,751,847 B2 | 6/2014 | Cerwinski et al. | |
| 9,026,629 B2 | 5/2015 | Swindell | |
| 9,223,664 B1 * | 12/2015 | Watson | G06F 11/2015 |

(Continued)

OTHER PUBLICATIONS

The International Search Report and Written Opinion for related PCT application PCT/US2019/017625 dated May 22, 2019.

(Continued)

*Primary Examiner* — Terrell S Johnson
(74) *Attorney, Agent, or Firm* — Bracewell LLP; Constance G. Rhebergen; Ryan B. McBeth

(57) ABSTRACT

The described embodiments provide a graceful power transition system that can be configured as part of an enterprise computing system, workstations, a carrier grade computing system, and other similar computing systems is described. Power failure can cause potential problems that relate to data integrity, data loss, processing operations completion and timeliness, componentry reliability, and componentry failures, as well as other potential problems. The graceful power transition system recognizes these issues and provides numerous configurable embodiments that allow for smooth power down and power up transitions when power failures, power fluctuations, and return of power events occur. Embodiments of this system can be particularly useful in regions where power failure and power fluctuations are frequent.

20 Claims, 7 Drawing Sheets

(56) References Cited

U.S. PATENT DOCUMENTS

| | | | |
|---|---|---|---|
| 2005/0149646 A1* | 7/2005 | Kadatch | G06F 1/3203 710/24 |
| 2010/0174934 A1* | 7/2010 | Zhao | G06F 1/3203 713/324 |
| 2013/0262898 A1 | 10/2013 | Preston et al. | |
| 2013/0326237 A1* | 12/2013 | Holdengreber | G06F 1/26 713/300 |
| 2015/0143099 A1* | 5/2015 | Preston | G06F 9/4418 713/2 |
| 2016/0328010 A1 | 11/2016 | Cochran et al. | |
| 2017/0038811 A1 | 2/2017 | Kelley et al. | |

OTHER PUBLICATIONS

Hannon, "PowerChute Network Shutdown in Redundant UPS Configurations", APC by Schneider Electric Industries SAS, Feb. 2017, 6 pages.

Nelson, "How to Make Your PC Restart Automatically After a Power Outage", TechNewsWorld, Sep. 12, 2013, 4 pages.

* cited by examiner

POWER MANAGEMENT OF COMPUTING AND COMMUNICATIONS SYSTEMS DURING POWER FLUCTUATION AND SUDDEN POWER FAILURE EVENTS

FIELD

Embodiments of the present disclosure relate to power management regarding enterprise, carrier grade, and other computing and communications systems.

DESCRIPTION OF THE RELATED ART

Enterprise and carrier grade computing and communications systems have been in use for many years. These systems include enterprise computing systems, workstations, data switches, routers, networking devices, input/output hubs, and many other devices that are similar to those listed. Over the years, these sophisticated computing and communications systems and their components as well as accessories have been developed and improved upon. Power management and control has also been an area of development for these systems. For example, for networked computing systems, a wake-on-LAN or "WOL" feature has long been embedded as a feature in these systems and allows a system to be activated and powered on when certain network activity prompts the system to wake up. Many similar power management features have been developed over the years. In some countries and particular regions of the world, power service disruption can occur on a regular or semi-regular basis. In regions such as these, systems can often be abruptly shut-down due to lack of electricity. This can cause data integrity issues, processing operations completion and timeliness issues, componentry reliability issues, and componentry failures, as well as other potential problems. Some solutions to counter abrupt shut-down problems have been developed but these solutions often have shortcomings and are not complete solutions to abrupt power loss issues. For example, one solution is to provide universal external battery backups to keep systems running during brief power outages. Enterprise and carrier grade communications systems as well as their accessory systems often consume large amounts of power as compared to the power that typical universal external battery backup systems can provide. Battery backup systems can also be costly and due to their power storage limitations are often limited to relatively small time windows over which they can keep a system operational that is running a regular workload.

Space constraints of modern computing environments also plays a factor. Small to medium sized enterprise server and communications rooms are often configured without backup generators or UPS systems due to space and cost constraints. Further, individual workstations are also often configured without such systems for the same reasons.

Due to the shortcomings of the above systems and methods it would be desirable to have a system that can avoid or limit some of the shortcomings of prior systems.

SUMMARY

Embodiments of the described systems aim to allow for the graceful power down of enterprise and carrier grade computing and communications systems during sudden power failure and power fluctuation events. The described systems also aim to allow for graceful power up when power has returned or power fluctuations have subsided. Following sudden power failures, enterprise computing systems, workstations, carrier grade computing systems, data switches, routers, networking devices, input/output hubs, and many other devices that are similar to those listed, can experience a wide variety of potential problems. These potential problems can include data integrity issues, data loss issues, processing operations completion and timeliness issues, componentry reliability issues, and componentry failures, as well as other potential problems. The present disclosure provides embodiments that limit these issues or avoid them entirely in some instances. In an embodiment, each individual enterprise or carrier grade system can be configured with a built-in or detachable battery and circuitry that can be configured to sense power loss when line power to a system shuts off. In an embodiment, the power loss detection circuitry can be configured to send a signal to a power control system of the enterprise or carrier grade system. In an embodiment, the power control system can be configured to switch the enterprise or carrier grade system power source to the built-in or detachable battery depending on the configuration of a particular system. Once this operation has been completed or while it is completing, in an embodiment, a power-down communication can be sent to the enterprise or carrier grade system informing the system of the power loss and directing the system to shut down. Similarly, in an embodiment, once power has been restored, a power-on communication can be sent to the enterprise or carrier grade system directing the system to power up. In an alternative embodiment, the power-down communication can be sent with an estimate of available time on battery power remaining such that the enterprise or carrier grade system can delay powering down. In an embodiment, if the enterprise or carrier grade system is in a delayed power-down state, and a power-on communication comes into the system, the power-down message can simply be cancelled. Such an embodiment can be useful in situations where power is fluctuating on and off and battery power intervals can keep a system operational during shorter power outage windows. In a further embodiment, to account for power fluctuation events, upon a sensing of power loss, a system can be configured to stay on battery power for a specified wait time. The wait time can be configured to match with the systems power usage and the available battery power. If power is restored before the wait time expires, then the system can switch back to its primary power source. If power is not restored for the duration of the wait time, the system can initiate a graceful hibernation sequence.

In an embodiment, a computing system configured for graceful power transitions can include at least the following: a processor, memory configured to communicate with the processor, non-volatile memory containing operating system and other software, configured to communicate with the memory, a network interface configured to communicate with the processor, input/output channels configured to communicate with the processor, a power control system, a modular battery, and power sense circuitry. In an embodiment, the computing system can further be configured to connect to and be powered by an external power source. An embodiment can further include the power sense circuitry configured to detect when the external power source has a power loss and further configured to provide a notification of the power loss to the power control system. An embodiment may also include the power control system configured to switch to relying on modular battery power to power the computing system upon receiving a notification of power loss.

In an embodiment, the power sense circuitry, power control system, and modular battery can each be configured as part of the computing system.

In an embodiment, the power control system can be configured to relay a notification to the computing system informing the computing system of the power loss in response to receiving the notification of power loss from the power sense circuitry.

In an embodiment, in response to receiving the notification of power loss from the power control system, the computing system can be configured to enter into a hibernation state, thereby ensuring data integrity, protecting the computing system, and allowing for a swift recovery to the operational state when power is restored.

In an embodiment, in response to receiving the notification of power loss from the power control system, the computing system can be configured to enter into a shutdown state, thereby ensuring data integrity, protecting the computing system, and allowing for a swift recovery to the operational state when power is restored as well as significantly reducing the overall power consumption of the computing system while on battery power.

In an embodiment, upon a power return from the external power source, the power sense circuitry can be configured to detect the power return and provide a notification of the power return to the power control system; the power control system is further configured to switch to relying on the external power source to power the computing system upon receiving a notification of power return.

In an embodiment, the power control system can be configured to relay a notification to the computing system informing the computing system of the power return in response to receiving the notification of power return from the power sense circuitry.

In an embodiment, in response to receiving the notification of power return from the power control system, the computing system is configured to wake up from a hibernation state and return the system to normal operation.

In an embodiment, in response to receiving the notification of power return from the power control system, the computing system is configured to wake up from a shutdown state and return the system to normal operation.

In an embodiment, the computing system configured can be an enterprise computing system.

In an embodiment, a method of graceful power transitions for a computing system can comprise the following steps: configuring and deploying a computing system, comprising a processor, memory configured to communicate with the processor, non-volatile memory containing operating system and other software, configured to communicate with the memory, a network interface configured to communicate with the processor, input/output channels configured to communicate with the processor, a power control system, a modular battery, power sense circuitry, and the computing system can further be configured to connect to and be powered by an external power source, the power sense circuitry configured to detect when the external power source has a power loss and further configured to provide a notification of the power loss to the power control system, and the power control system configured to switch to relying on modular battery power to power the computing system upon receiving a notification of power loss; sensing, by the power sense circuitry, when the external power source has a power loss; notifying, the power control circuitry, by the power sense circuitry, that a power loss has occurred; and switching the computing system to rely on modular battery power.

BRIEF DESCRIPTION OF THE DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

Figure 1:
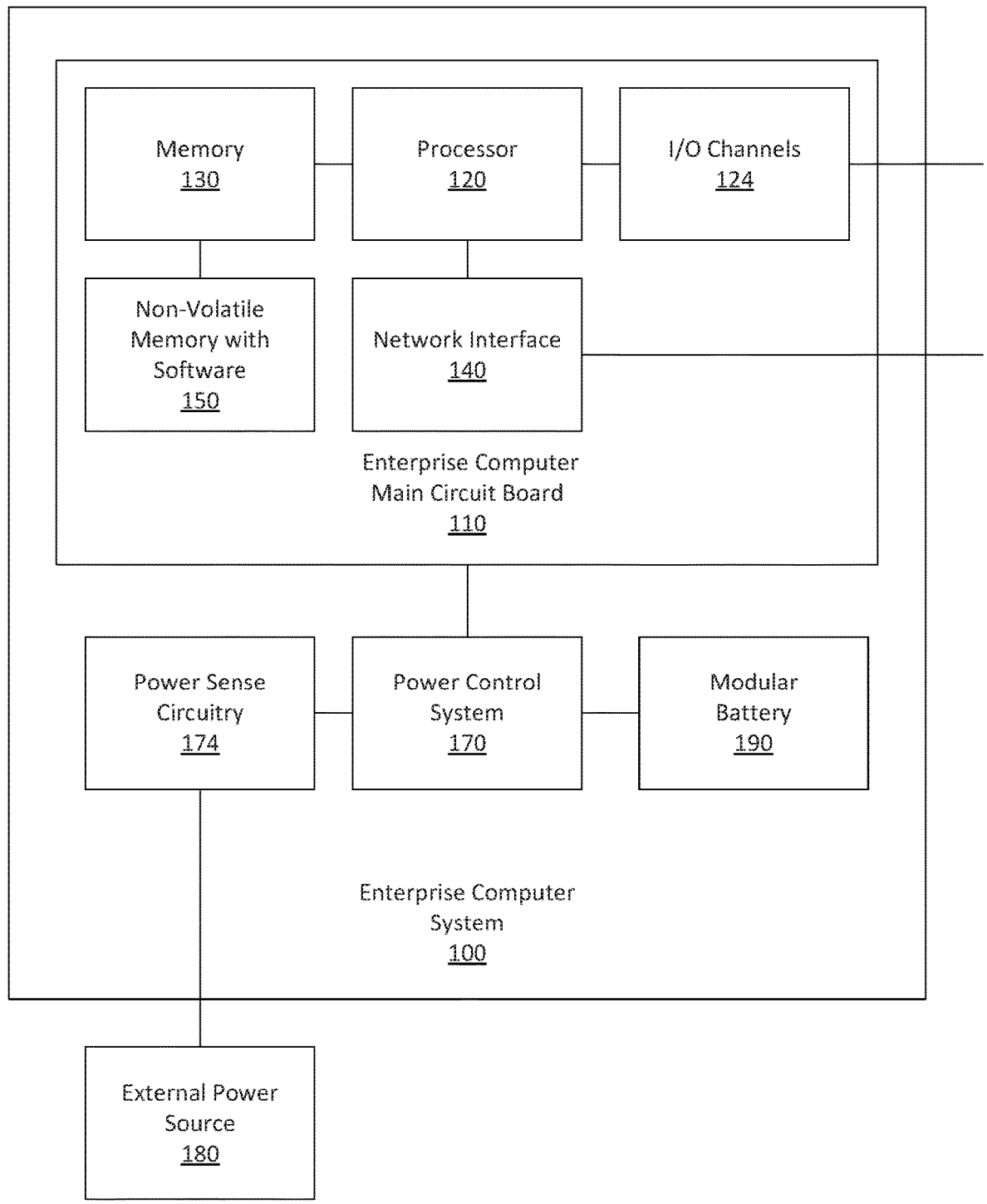
FIG. 1 illustrates one example embodiment of a graceful power shutdown system of an enterprise computer system.

Of note, though example figures are illustrated and described for embodiments including enterprise and carrier grade computing systems, the following computing systems can also be configured in an embodiment of the illustrated and described systems: enterprise computing systems, workstations, carrier grade communications systems, data switches, routers, networking devices, input/output hubs, end user devices, mobile devices, and many other devices that are similar to those listed. Further, the general term "computing system" can refer to any of the system types listed and also may refer to many other devices that are similar to those listed.

DETAILED DESCRIPTION

Advantages and features of the invention and methods of accomplishing the same will be apparent by referring to embodiments described below in detail in connection with the accompanying drawings. However, the invention is not limited to the embodiments disclosed below and may be implemented in various different forms. The embodiments are provided only for completing the disclosure of the present invention and for fully representing the scope of the invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments. Like reference numerals refer to like elements throughout the specification.

Embodiments provide graceful power shutdown or hibernation of enterprise computing systems, workstations, carrier grade communications systems, data switches, routers, networking devices, input/output hubs, and many other devices that are similar to those listed, during sudden power failure and are described in detail in the following paragraphs with reference to the accompanying drawings. Following sudden power failures enterprise computing systems, workstations, carrier grade communications systems, data switches, routers, networking devices, input/output hubs, and many other devices that are similar to those listed, can experience a wide variety of potential problems. These potential problems can include data integrity issues, data loss issues, processing operations completion and timeliness issues, componentry reliability issues, and componentry failures, as well as other potential problems. The present disclosure provides embodiments that aim to limit these issues or avoid them entirely in some instances.

Referring to FIG. 1, one example embodiment of a graceful power shutdown system of an enterprise computer system is shown. Notably, this system can also be referred to as a graceful power "transition" system in that many of the embodiments described interface with both power down ("shutdown") and power up sequences. In FIG. 1, an enterprise computer system 100 is shown and configured with an enterprise computer main circuit board 110 that is further configured with a processor 120, memory 130, a network interface 140, non-volatile memory with software 150, and input/output ("I/O") channels 124. The enterprise computer system 100 shown is merely one example configuration of an enterprise computer system and numerous other enterprise system configurations can be configured with the graceful power shutdown system described herein. For example, an enterprise computer system may include a desktop system with one motherboard and one processor configured, an enterprise computer system can also include a multi-processor system having multiple motherboards, multiple processors, and significant input/output configured. These are merely example computing systems and a wide variety of systems are contemplated for use with the various embodiments of the graceful power shutdown system described. For example, the graceful power transition embodiments described can be configured with any of enterprise computing systems, carrier grade communications systems, data switches, routers, networking devices, input/output hubs, and many other devices that are similar to those listed.

Again referring to FIG. 1, the graceful power shutdown system can further be configured to include a power control system 170, power sense circuitry 174, and a modular battery 190. In an embodiment, the modular battery 190 can be "built-in" to the system, meaning the battery is hard-wired into the system, or the modular battery can connect into the system such that it is swappable. The battery installation may depend on the desired configuration and engineering specifications for a particular system. In an alternative embodiment, the modular battery 190 can be configured to be "hot-swappable" meaning that the modular battery may be exchanged for another modular battery while the system is running. This configuration would be helpful to IT personnel who may need to exchange system batteries from time-to-time due to the degradation of battery performance over time. For example, it might be desirable to swap out system batteries every few years to maximize battery longevity in a given system. FIG. 1 further illustrates the external power source 180 that is connected to and the main source of power for the enterprise computer system 100.

Again referring to FIG. 1, during regular operation the enterprise computer system 100 is powered by the external power source 180; this will typically be line power off of a municipal power grid, though it may be solar, generator, battery power, or come from another source depending on the configuration of the particular site the computer system is installed at. The power sense circuitry 174 is configured to detect when the external power source 180 begins to cease supplying power. The power sense circuitry 174 can have a variety of configurations, in an embodiment, this circuitry can be configured as a simple analog circuit or as a microcontroller with input/output channels that can be used to detect and sense power failures. In an embodiment, the power sense circuitry can be configured with sensors that detect when the external power source ceases to supply power. Once the power sense circuitry 174 detects power loss, depending on the embodiment and configuration, a communication signal or message is then sent to the power control system 170. In an embodiment, the power control system 170 will then switch from utilizing the external power source 180 to using the modular battery 190 as the power source for the system 100. In an embodiment, the modular battery 190 can constantly be part of the power circuit for the enterprise computer system 100 such that upon loss of power the modular battery 190 is automatically supplying power to the system 100.

Still to referring to FIG. 1, once the modular battery 190 is powering the system, depending on the power usage of the system, limited runtime on battery power is likely and it may not be known when the external power source 180 will return to supplying power. In recognition that only limited runtime on battery power may be available, in an embodiment, the power control system 170 can send a signal or message to the enterprise computer system 100 indicating that the system 100 is now running on battery power. As power fluctuations may also be an issue in some regions, the system can be configured to stay on battery power for a particular wait time. The wait time can be configured based on the system type, the typical power usage of the system type, and the capacity of the battery configured as part of the system. If the power is restored to the system before the wait time elapses, then the system can switch back to the primary power source. If power is not restored to the system, the system may initiate a graceful hibernation sequence. In an embodiment, once the enterprise computer system 100 is made aware that it is running off of the modular battery 190, it can then initiate a "hibernation" or shutdown sequence depending on how the system is configured. In some instances it may be desirable for the system to enter into a "hibernation" or "sleep" state where the system powers down most devices and ceases most functions. For example, it may be desirable to keep system memory 130 powered and thus keep the contents of system memory 130, such that when power is returned the system 100 can return to normal operation more quickly. In other instances a graceful shutdown sequence may be more desirable such that the system finishes current processing operations on the limited battery power and then shuts down. In an embodiment, a graceful shutdown sequence can also include writing the contents of memory 130 or what is needed from the contents of memory 130 to the non-volatile memory 150 before power to memory 130 is shut off. In an embodiment, a graceful shutdown sequence can also include completing certain I/O channel 124 operations or certain network interface 140 operations or both, to ensure that communications are not left partially sent, this may be dependent on the particular I/O and network protocols that are being used. In some embodiments of a graceful shutdown sequence it may be desirable to send I/O or network communications or both to other systems the enterprise computer system 100 is communicating with to let them know that the system 100 is entering into a "hibernation" or shutdown state.

Again referring to FIG. 1, once the enterprise computer system 100 is in a "hibernation" or shutdown state, in an embodiment, the power sense circuitry 174 and power control system 170 can be configured to still receive power from the modular battery 190. In this embodiment, the power sense circuitry 174 can monitor for when power is restored from the external power source 180 and send a signal or message to the power control system 170 to let that system know. In an embodiment, once external power is restored to the system 100, the power control system 170 can cause power to be restored to the various components and sub-components of the enterprise computer system 100 and cause the system 100 to resume normal operations. There are various procedures that may be followed to execute the "wake-up" sequence for the computer system 100. For example, if the system 100 is in a shutdown mode and external power is returned. Specific "wake-up" or "power-up" sequence code can be loaded from non-volatile memory 150 and run by the processor 120. In an embodiment, the "wake-up" code can restore or partially restore the prior run state of the system 100 or may simply re-initiate certain processes and tasks to get the system 100 back up to normal operation again. In an embodiment, a specific "wake-up" code sequence can be written to memory 130 or non-volatile memory 150 prior to entering a "hibernate" or shutdown state such that the "wake-up" code sequence can be specifically tailored to the current run state of the system 100. The intention of having specific "wake-up" code is to ensure that the system 100 can quickly and efficiently return to a normal operational state once external power is restored. In an embodiment, for example, any unsaved data that a particular user was working with could be restored.

Referring to FIGS. 2-6, various examples of enterprise and carrier grade computer systems configured with example embodiments of graceful power shutdown systems are described. The previous descriptions regarding the various configurations and embodiments of the power sense circuitry, power control system, modular battery, external power source, and communications and interaction with the enterprise computer system, as described in relation to FIG. 1, also applies and can be applied to each of the systems described in FIGS. 2-6. The systems described in FIGS. 2-6 are intended to be illustrative of some of the various embodiments that are configurable and achievable and are not intended to be limiting. The components, sub-components, routines, and logic flows that are described in relation to one described embodiment can also be configured in relation to the other described embodiments.

Figure 2:
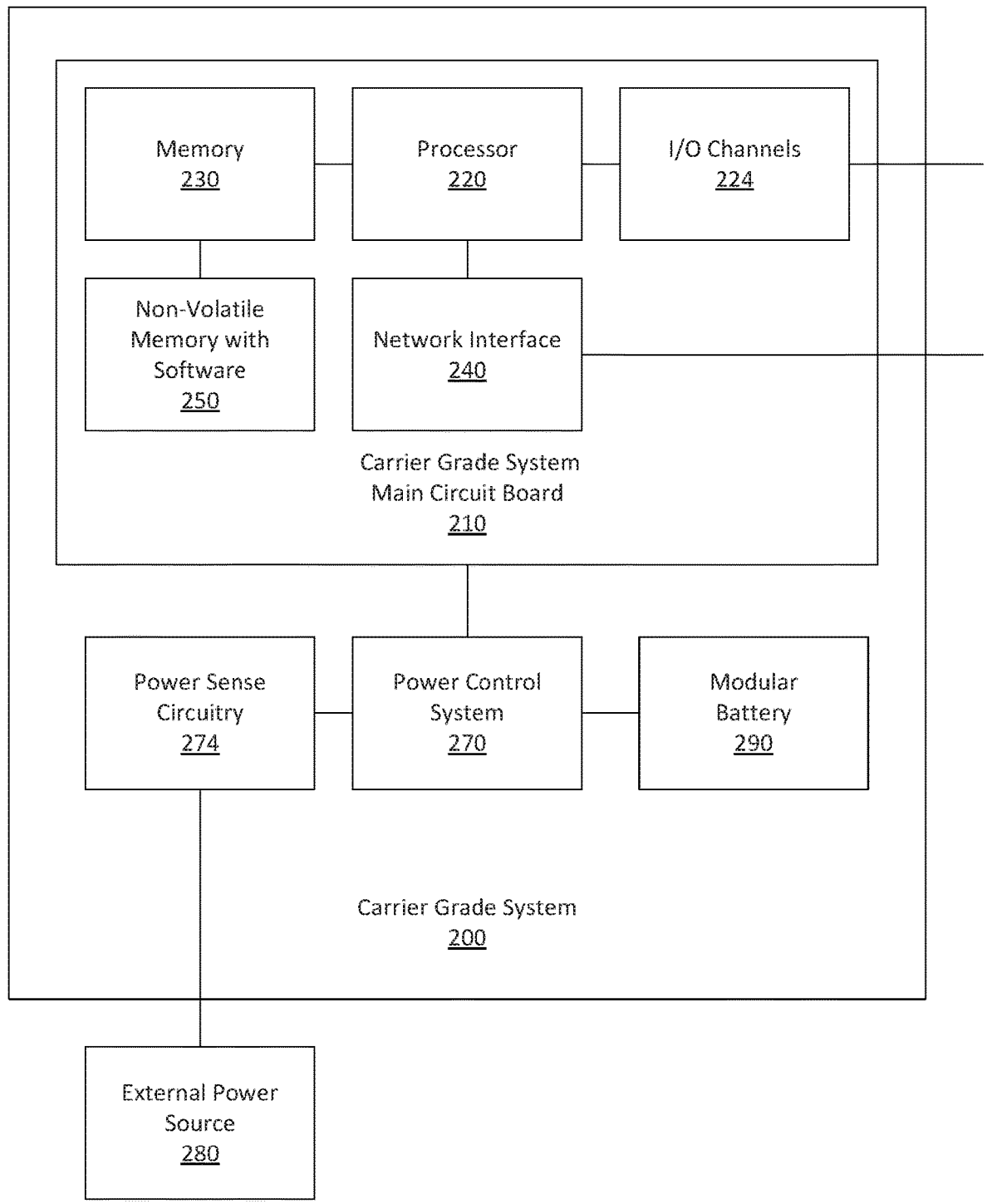
FIG. 2 illustrates one example embodiment of a graceful power shutdown system of a carrier grade system.

Referring to FIG. 2, one example embodiment of a graceful power shutdown system of a carrier grade system is shown. This embodiment is configured similarly to the enterprise grade system of FIG. 1. Again referring to FIG. 2, a carrier grade system 200 is shown and configured with carrier grade system main circuit board 210 that is further configured with a processor 220, memory 230, a network interface 240, non-volatile memory with software 250, and input/output ("I/O") channels 224. The carrier grade system 200 shown is merely one example configuration of carrier grade system and numerous other carrier system configurations can be configured with the graceful power shutdown system described herein. For example, a carrier grade system may include a telecommunications system that includes wireless communications hardware and that connects to antenna arrays. Other telecommunications systems can be utilized and this is one example system that can be configured in conjunction with an embodiment of a graceful power shutdown, such as those described herein. In an embodiment, the system 200 illustrated in FIG. 2 further includes, power sense circuitry 274, power control system 270, an external power source 280, and modular battery 290. In this embodiment, each of the power control system 270, power sense circuitry 274, and modular battery 290 are configured as part of the carrier grade system 200. In other embodiments, some of which are illustrated and described with respect to subsequent figures, each of these individual components can be internal or external to the system and can also be combined with each other depending on the desired configuration of the system. For example, the power sense circuitry and power control system can be engineered as one logical unit if desired.

Figure 3:
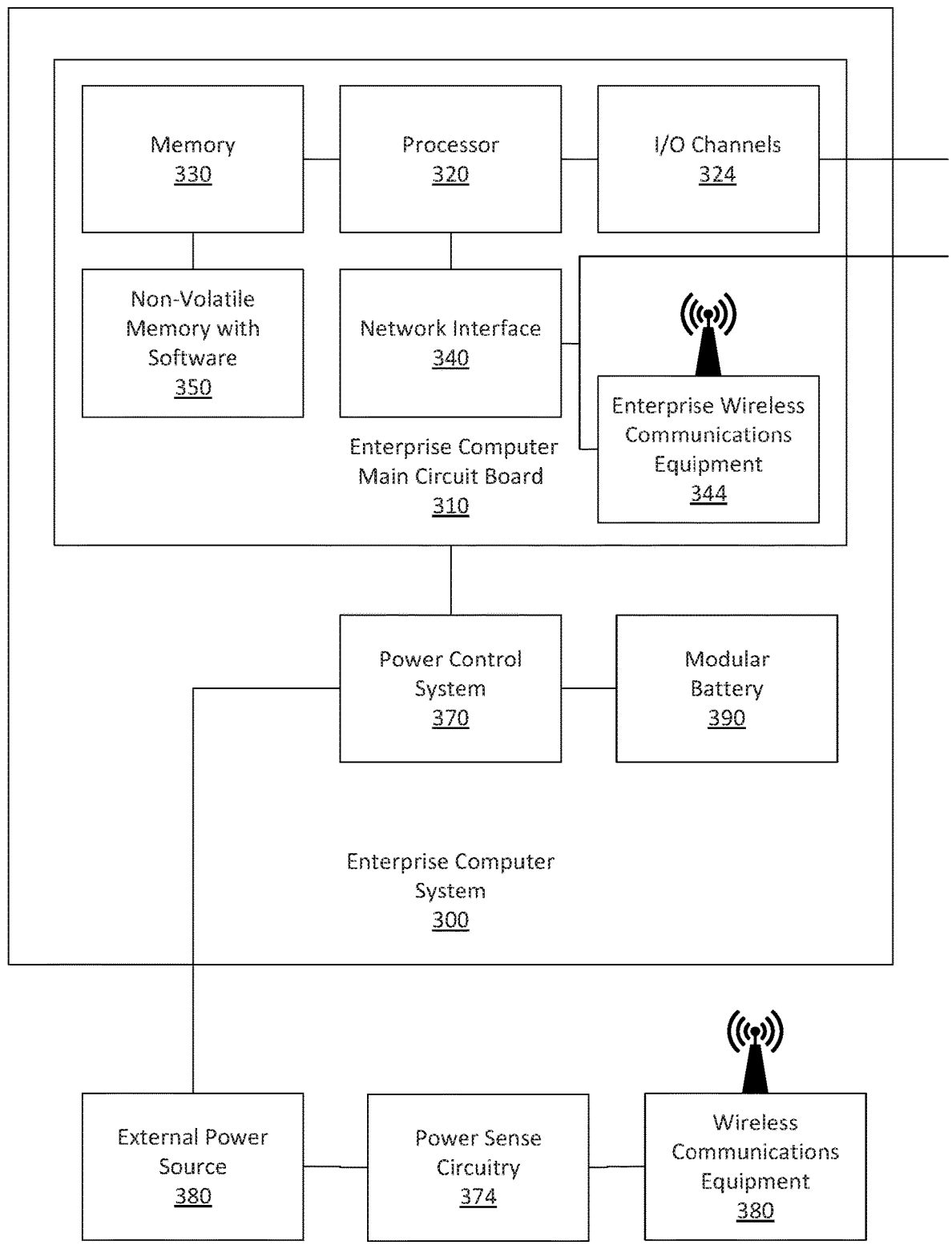
FIG. 3 illustrates one example embodiment of a graceful power shutdown system of an enterprise computer system wherein power sense circuitry is configured external to the system and the system is configured to wirelessly communicate with the power sense circuitry.

Referring to FIG. 3, one example embodiment of a graceful power shutdown system of an enterprise system is shown. An enterprise system 300 is shown and configured with an enterprise system main circuit board 310 that is further configured with a processor 320, memory 330, a network interface 340, non-volatile memory with software 350, input/output ("I/O") channels 324, and enterprise wireless communications equipment 344. The enterprise system 300 shown is merely one example configuration of an enterprise system and numerous other enterprise system configurations can be configured with the graceful power shutdown system described herein. In an embodiment, the system 300 illustrated in FIG. 3 further includes, power sense circuitry 374, power control system 370, an external power source 380, and modular battery 390. In this embodiment, each of the power control system 370, and modular battery 390 are configured as part of the enterprise system 300 and the power sense circuitry 374 is configured externally to the enterprise system 300. The power sense circuitry 374 is further configured to connect to wireless communications equipment 380. In this embodiment, the power sense circuitry 374 is external to the system 300, though it may still serves a similar role and can have similar configurations previously described. In this embodiment, when the power sense circuitry 374 detects power loss, a signal or message can be sent wirelessly using the wireless communications equipment 380 to the system 300 by its enterprise wireless communications equipment 344. This system allows the power sense circuitry 374 to be located away from the system 300 in installations where that may be desirable. In an embodiment, the wireless communications protocols of the wireless communications equipment 380 and enterprise wireless communications equipment 344 can include Bluetooth, Wi-Fi, cellular, and other similar protocols.

Figure 4:
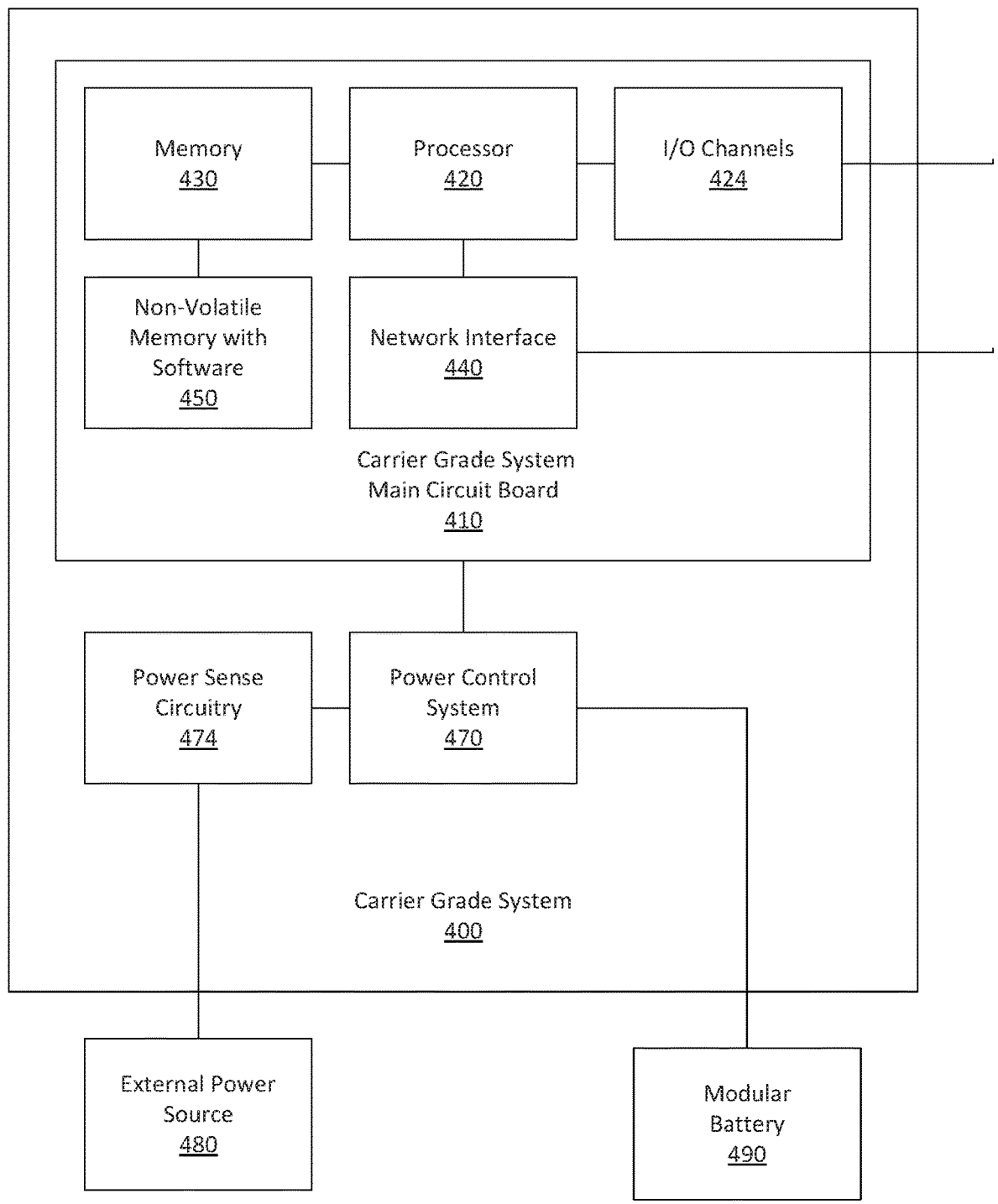
FIG. 4 illustrates one example embodiment of a graceful power shutdown system of a carrier grade system having a modular battery configured externally to the system.

Referring to FIG. 4, one example embodiment of a graceful power shutdown system of a carrier grade system is shown. A carrier grade system 400 is shown and configured with carrier grade system main circuit board 410 that is further configured with a processor 420, memory 430, a network interface 440, non-volatile memory with software 450, and input/output ("I/O") channels 424. The carrier grade system 400 shown is merely one example configuration of carrier grade system and numerous other carrier system configurations can be configured with the graceful power shutdown system described herein. In an embodiment, the system 400 illustrated in FIG. 4 further includes, power control system 470, power sense circuitry 474, an external power source 480, and modular battery 490. In this embodiment, each of the power sense circuitry 474 and power control system 470 are configured as part of the carrier grade system 400 and the modular battery 490 is configured externally to the enterprise system 400. In this embodiment the modular battery 490 can still be in close proximity to the carrier grade system 400 or may be located away from the system 400. For example, the battery 490 can be configured as a modular battery back that hangs onto the rear chassis of a rack-mounted system, such a configuration can conform to pre-existing space constraints for some systems and may be useful for some configurations. In another embodiment it may be desirable to plug the modular battery in-line with the main power source or simply to locate the battery away from the system. This embodiment is intended to show some flexibility in the location of the modular battery of a graceful power shutdown system.

Figure 5:
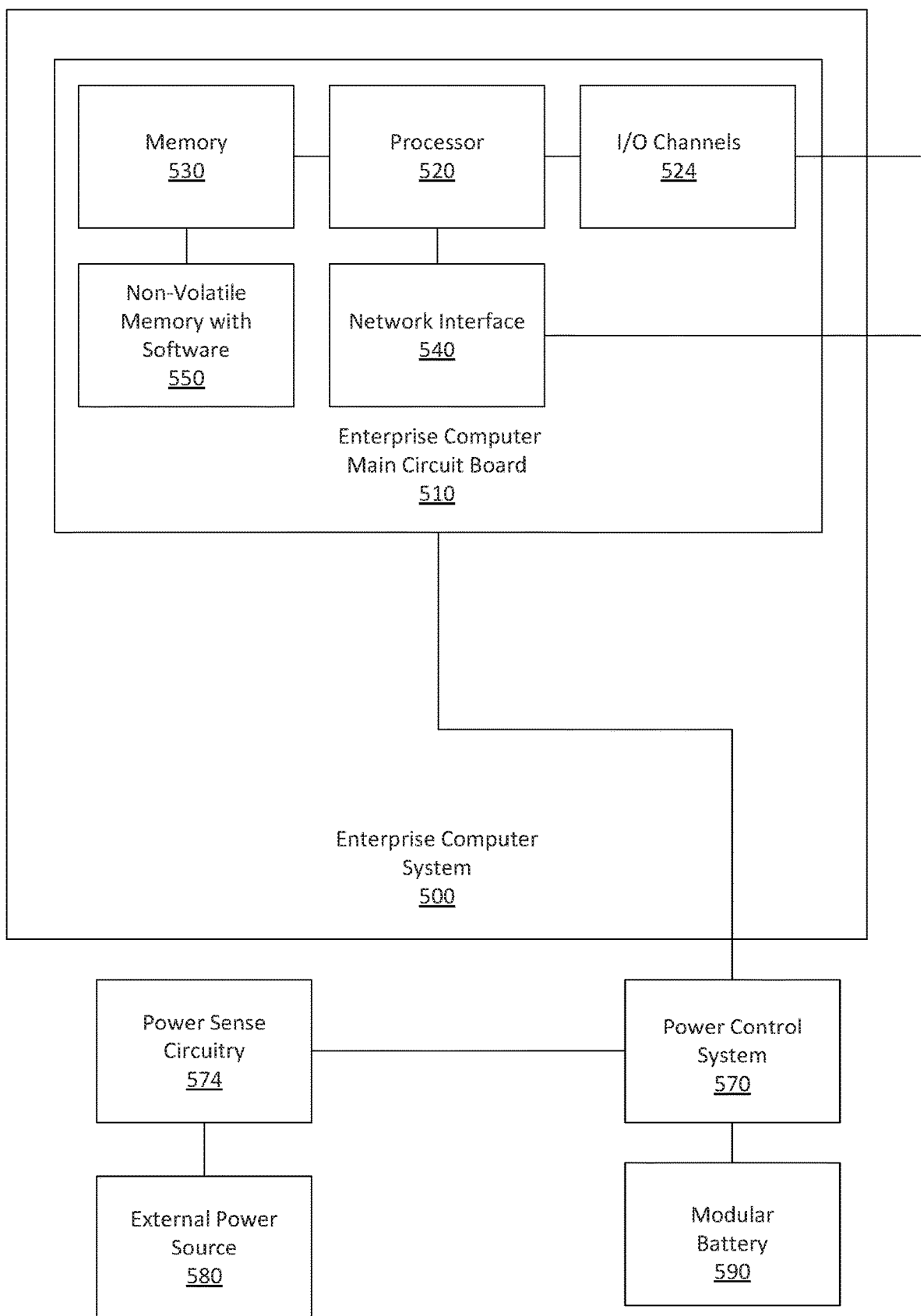
FIG. 5 illustrates one example embodiment of a graceful power shutdown system of an enterprise computer system having power sense circuitry, a power control system, and a modular battery that are each configured externally to the system.

Referring to FIG. 5, one example embodiment of a graceful power shutdown system of an enterprise system is shown. An enterprise system 500 is shown and configured with an enterprise system main circuit board 510 that is further configured with a processor 520, memory 530, a network interface 540, non-volatile memory with software 550, and input/output ("I/O") channels 524. The enterprise system 500 shown is merely one example configuration of an enterprise system and numerous other enterprise system configurations can be configured with the graceful power shutdown system described herein. In an embodiment, the system 500 illustrated in FIG. 5 further includes, power control system 570, power sense circuitry 574, an external power source 580, and modular battery 590. In this embodiment, each of the power control system 570, power sense circuitry 574, and modular battery 590 are configured externally to the enterprise system 500. In this embodiment these external components can still be in close proximity to the enterprise system 500 or may be located away from the system 500. For example, these components can be configured as part of a modular battery pack that hangs or connects onto the rear chassis of a rack-mounted system, such a configuration can conform to pre-existing space constraints for some systems and may be useful for some configurations. In another embodiment, it may be desirable to configure these external components in-line with the main power source or simply to locate these external components away from the system. This embodiment is intended to show some flexibility in the location of the componentry of a graceful power shutdown system.

In an embodiment, the modular batteries configured as a component of the graceful power shutdown system embodiments described herein can be significantly reduced in size when compared to universal battery backup power supplies. In embodiments of this system, since a shutdown or "hibernation" sequence can be initiated quickly, the battery only needs to maintain the system power load for a small window of time, thus allowing the overall power capacity and size of the battery to be reduced. In an embodiment, various battery sizes can be configured depending on the load and runtime requirements of a particular system, it may also be desirable for a battery pack to be capable of handling multiple close in proximity power outages, where the battery may not have time to fully recharge.

Figure 6:
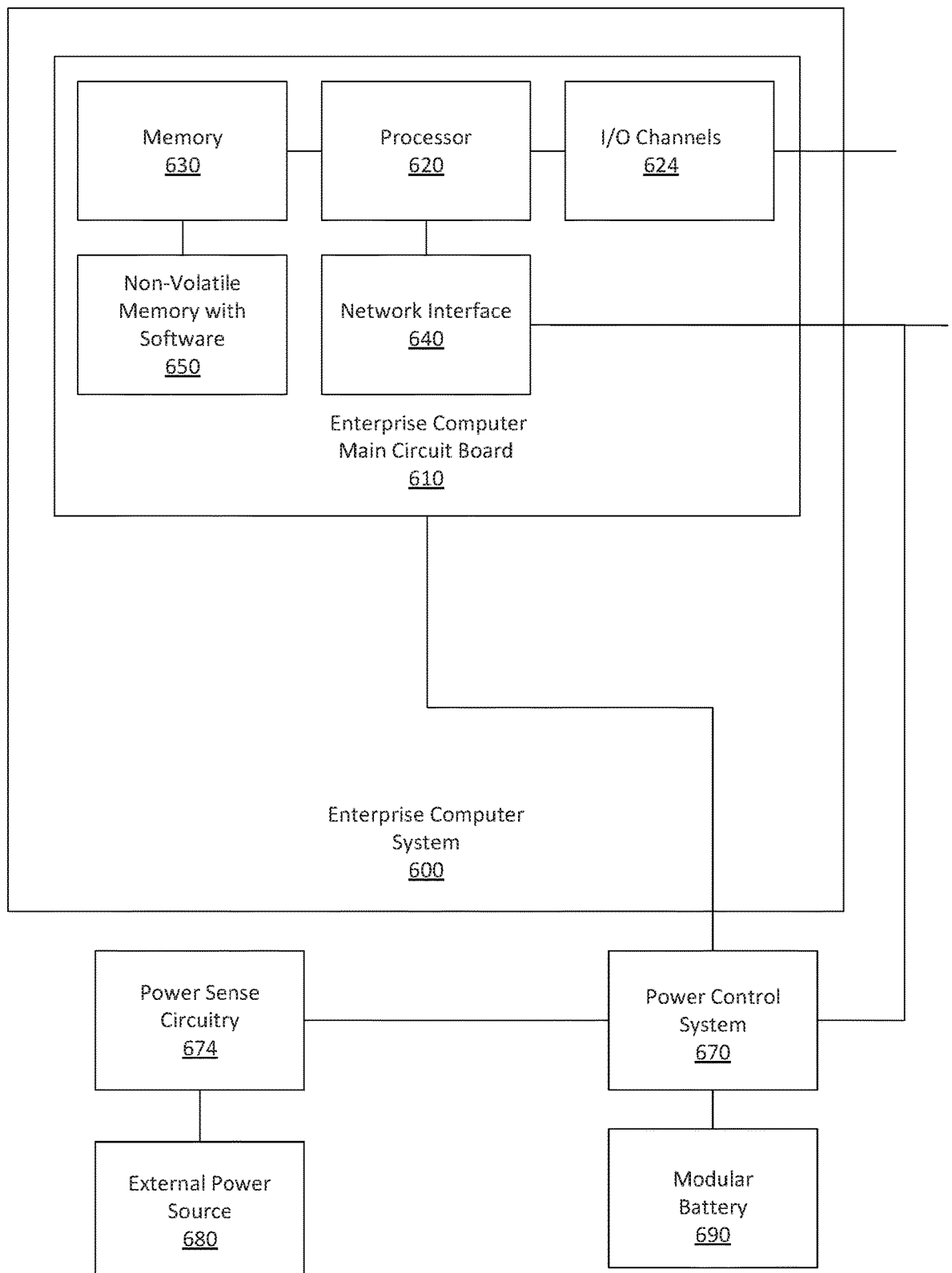
FIG. 6 illustrates one example embodiment of a graceful power shutdown system of an enterprise computer system having power sense circuitry, a power control system, and a modular battery that are each configured externally to the system and where the power control system is configured to communicate with the enterprise computer system via the network interface of the enterprise computer system.

Referring to FIG. 6, one example embodiment of a graceful power shutdown system of an enterprise system is shown. An enterprise system 600 is shown and configured with an enterprise system main circuit board 610 that is further configured with a processor 620, memory 630, a network interface 640, non-volatile memory with software 650, and input/output ("I/O") channels 624. The enterprise system 600 shown is merely one example configuration of an enterprise system and numerous other enterprise system configurations can be configured with the graceful power shutdown system described herein. In an embodiment, the system 600 illustrated in FIG. 6 further includes, power control system 670, power sense circuitry 674, an external power source 680, and modular battery 690. In this embodiment, each of the power control system 670, power sense circuitry 674, and modular battery 690 are configured externally to the enterprise system 600. In this embodiment these external components can still be in close proximity to the enterprise system 600 or may be located away from the system 600. In an embodiment, and as illustrated in FIG. 6, the power control system 670 of this system can be configured to connect to the network interface 640 of the enterprise computer system 600. This communications connection allows the power control system to send communications to the enterprise computer system 600 that instruct the system 600 to go into "hibernation" or shutdown depending on the desired power-down sequence of the particular system that is configured. In this instance, and in an embodiment, the "wake-up" or "power-up" sequence can be initiated using the wake-on-lan or "WOL" feature previously described. In an embodiment, the network interface 640 can also have an alternative low power state where it can receive specific network messages and instructions regarding the desired power state of the system 600.

Figure 7:
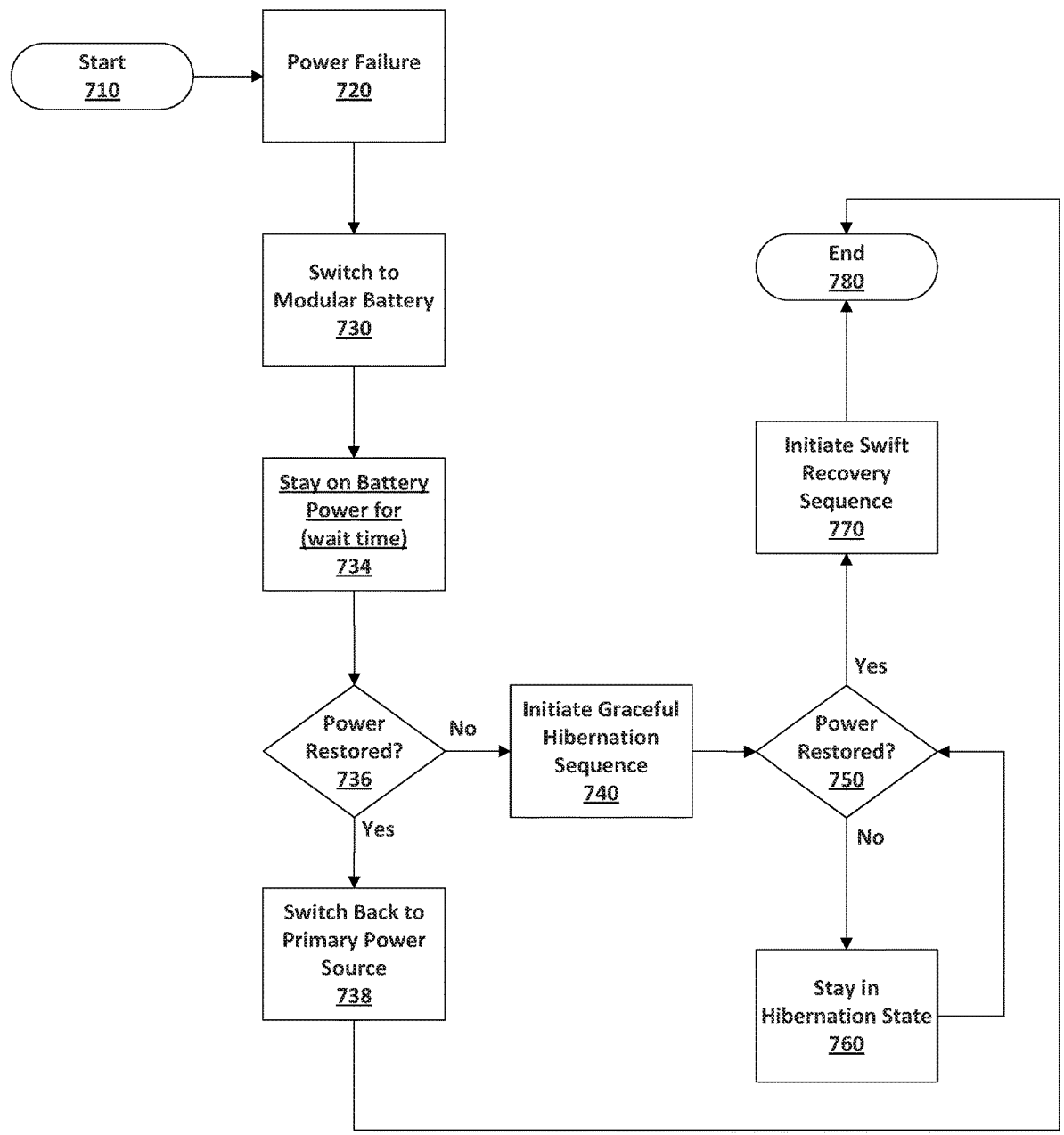
FIG. 7 illustrates a block diagram of one example embodiment of the logic flow of a graceful power shutdown system that is also configured to handle a power fluctuation event without shutting down.

Regarding FIG. 7, a block diagram of one example embodiment of the logic flow of a graceful power shutdown system of an enterprise computer system is shown. The logic flow starts at the "Start" block 710 with the system in the running and fully operational state. When a power failure is detected 720, the system switches to modular battery power 730, and stays on modular battery power for a specified wait time 734, if after the wait time power has been restored 736 then the system will switch back to the primary power source 738 and the logic flow ends 780. If power has not been restored after the wait time then a graceful hibernation sequence is initiated 740. Once the graceful power hibernation sequence is initiated 740, the power control system will query if power is restored 750. If power has not yet been restored, the system will stay in hibernation mode 760 until it is restored. Once power is restored the system will initiate the swift recovery or "wake-up" sequence 770 and the logic flow ends 780. Once the system has gone through the logic flow and returned to the operational state, the flow starts again awaiting the next power failure.

Each of the embodiments and configuration possibilities described herein can be applied to each of enterprise grade systems, workstations, carrier grade communications systems, data switches, routers, networking devices, input/output hubs, and many other devices that are similar to those listed.

In an embodiment, one or more modular batteries can be configured. In a further embodiment where multiple batteries are configured, the system can be configured as capable of supporting "hot-swappable" batteries, meaning the system can be powered on while a portion of the batteries are swapped. In the case where two or more batteries or configured at least one battery at a time can be "hot-swapped"

while the system is running on battery power. In such an instance care would need to be taken to ensure that enough batteries remained installed to power the system and safety considerations of operations personnel swapping the batteries would also need to be accounted for.

Of note, though example embodiments are described primarily in regard to enterprise and carrier grade computing and communications systems, the following computing systems can also be configured in an embodiment of the illustrated and described systems: enterprise computing systems, workstations, carrier grade communications systems, data switches, routers, networking devices, input/output hubs, end user devices, mobile devices, and many other devices that are similar to those listed. Further, the general term "computing system" can refer to any of the system types listed and also may refer to many other devices that are similar to those listed.

The above descriptions are meant to be illustrative of the various embodiments of the present invention. Various modifications will become apparent to those skilled in the art once the disclosure is considered as a whole.

The invention claimed is:

1. A computing system configured for graceful power transitions comprising:
   a computing system, further comprising:
      a processor,
      memory configured to communicate with the processor,
      non-volatile memory containing operating system and other software, configured to communicate with the memory,
      a network interface configured to communicate with the processor, the network interface configured with a first wireless communications equipment,
      input/output channels configured to communicate with the processor,
      a power control system,
      a modular battery, and
      power sense circuitry, the power sense circuitry further configured to connect and communicate through a second wireless communications equipment;
   the computing system configured to connect to and be powered by an external power source;
   the power sense circuitry configured to detect when the external power source has a power loss and further configured to provide a notification of the power loss to the power control system by sending a message wirelessly from the second wireless communications equipment to the first wireless communications equipment of the computing system, thereby allowing the power sense circuitry to be located away from the computing system;
   the power control system configured to switch to relying on modular battery power to power the computing system upon receiving a notification of power loss, and
   the computing system, in response to receiving the notification of power loss from the power control system, is further configured to stay on battery power for a pre-configured wait time before initiating a graceful hibernation sequence, thereby keeping computing system power constant for a power fluctuation event.

2. The computing system configured for graceful power transitions of claim 1, wherein the power sense circuitry, power control system, and modular battery are each configured as part of the computing system.

3. The computing system configured for graceful power transitions of claim 1, wherein the power control system is configured to relay a notification to the computing system informing the computing system of the power loss in response to receiving the notification of power loss from the power sense circuitry.

4. The computing system configured for graceful power transitions of claim 3, wherein, in response to receiving the notification of power loss from the power control system, the computing system is configured to enter into a hibernation state, thereby ensuring data integrity, protecting the computing system, and allowing for a swift recovery to the operational state when power is restored.

5. The computing system configured for graceful power transitions of claim 3, wherein, in response to receiving the notification of power loss from the power control system, the computing system is configured to enter into a shutdown state, thereby ensuring data integrity, protecting the computing system, and allowing for a swift recovery to the operational state when power is restored as well as significantly reducing the overall power consumption of the computing system while on battery power.

6. The computing system configured for graceful power transitions of claim 1, wherein, upon a power return from the external power source, the power sense circuitry is configured to detect the power return and provide a notification of the power return to the power control system; the power control system is further configured to switch to relying on the external power source to power the computing system upon receiving a notification of power return.

7. The computing system configured for graceful power transitions of claim 6, wherein the power control system is configured to relay a notification to the computing system informing the computing system of the power return in response to receiving the notification of power return from the power sense circuitry.

8. The computing system configured for graceful power transitions of claim 7, wherein, in response to receiving the notification of power return from the power control system, the computing system is configured to wake up from a hibernation state and return the system to normal operation.

9. The computing system configured for graceful power transitions of claim 7, wherein, in response to receiving the notification of power return from the power control system, the computing system is configured to wake up from a shutdown state and return the system to normal operation.

10. The computing system configured for graceful power transitions of claim 1, wherein the computing system is an enterprise computing system.

11. A method of graceful power transitions for a computing system comprising the following steps:
    configuring and deploying a computing system, comprising:
       a processor,
       memory configured to communicate with the processor,
       non-volatile memory containing operating system and other software, configured to communicate with the memory,
       a network interface configured to communicate with the processor, the network interface configured with a first wireless communications equipment,
       input/output channels configured to communicate with the processor,
       a power control system,
       a modular battery, power sense circuitry, the power sense circuitry further configured to connect and communicate through a second wireless communications equipment, and the computing system further configured to connect to and be powered by an external power source, the power sense circuitry configured to detect when the external power source has a power loss and further configured to provide a notification of the power loss to the power control system by sending a message wirelessly from the second wireless communications equipment to the first wireless communications equipment of the computing system, thereby allowing the power sense circuitry to be located away from the computing system, and the power control system configured to switch to relying on modular battery power to power the computing system upon receiving a notification of power loss;

sensing, by the power sense circuitry, when the external power source has a power loss, notifying, the power control circuitry, by the power sense circuitry, that a power loss has occurred, switching the computing system to rely on modular battery power, and waiting, by the computing system, for a pre-configured wait time before initiating a graceful hibernation sequence of the computing system, thereby keeping computing system power constant for a power fluctuation event.

12. The method of claim 11, wherein the power sense circuitry, power control system, and modular battery are each configured as part of the computing system.

13. The method of claim 11, wherein the power control system is configured to relay a notification to the computing system informing the computing system of the power loss in response to receiving the notification of power loss from the power sense circuitry.

14. The method of claim 13, wherein, in response to receiving the notification of power loss from the power control system, the computing system is configured to enter into a hibernation state, thereby ensuring data integrity, protecting the computing system, and allowing for a swift recovery to the operational state when power is restored.

15. The method of claim 13, wherein, in response to receiving the notification of power loss from the power control system, the computing system is configured to enter into a shutdown state, thereby ensuring data integrity, protecting the computing system, and allowing for a swift recovery to the operational state when power is restored as well as significantly reducing the overall power consumption of the computing system while on battery power.

16. The method of claim 11, wherein, upon a power return from the external power source, the power sense circuitry is configured to detect the power return and provide a notification of the power return to the power control system; the power control system is further configured to switch to relying on the external power source to power the computing system upon receiving a notification of power return.

17. The method of claim 16, wherein the power control system is configured to relay a notification to the computing system informing the computing system of the power return in response to receiving the notification of power return from the power sense circuitry.

18. The method of claim 17, wherein, in response to receiving the notification of power return from the power control system, the computing system is configured to wake up from a hibernation state and return the system to normal operation.

19. The method of claim 17 wherein, in response to receiving the notification of power return from the power control system, the computing system is configured to wake up from a shutdown state and return the system to normal operation.

20. The method of claim 11, wherein the computing system is an enterprise computing system.

* * * * *